United States Patent
Wan et al.

(10) Patent No.: US 12,112,253 B2
(45) Date of Patent: Oct. 8, 2024

(54) AERO-ENGINE FAULT DIAGNOSIS METHOD BASED ON FIFTH-GENERATION TELECOMMUNICATION TECHNOLOGY STANDARD DISTRIBUTED COMPUTING FRAMEWORK AND DEEP LEARNING

(71) Applicant: ZHEJIANG UNIVERSITY CITY COLLEGE, Hangzhou (CN)

(72) Inventors: Anping Wan, Hangzhou (CN); Jie Yang, Hangzhou (CN); Jiantao Yuan, Hangzhou (CN); Jinglin Wang, Hangzhou (CN); Tianmin Shan, Hangzhou (CN)

(73) Assignee: ZHEJIANG UNIVERSITY CITY COLLEGE, Hangzhou (CN)

( * ) Notice: Subject to any disclaimer, the term of this patent is extended or adjusted under 35 U.S.C. 154(b) by 0 days.

(21) Appl. No.: 17/795,693

(22) PCT Filed: Apr. 2, 2022

(86) PCT No.: PCT/CN2022/085126
§ 371 (c)(1),
(2) Date: Jul. 27, 2022

(87) PCT Pub. No.: WO2022/228049
PCT Pub. Date: Nov. 3, 2022

(65) Prior Publication Data
US 2024/0185040 A1 Jun. 6, 2024

(30) Foreign Application Priority Data
Apr. 27, 2021 (CN) .......................... 202110457105.X

(51) Int. Cl.
*G06F 30/27* (2020.01)
*G05B 23/02* (2006.01)
(Continued)

(52) U.S. Cl.
CPC ....... *G06N 3/0464* (2023.01); *G05B 23/0283* (2013.01); *G01M 15/14* (2013.01); *G06N 3/08* (2013.01)

(58) Field of Classification Search
CPC .......... G06N 3/0464; G06N 3/04; G06N 3/02; G06N 3/08; G06N 3/045; G06N 3/088;
(Continued)

(56) References Cited

U.S. PATENT DOCUMENTS

2018/0357542 A1\* 12/2018 Wu .......................... G06N 3/04
2020/0233397 A1  7/2020 Bello et al.
(Continued)

FOREIGN PATENT DOCUMENTS

CA   3128957 A1 \*  3/2020  ............. G06N 20/00
CN   111830408 A    10/2020
(Continued)

OTHER PUBLICATIONS

International Search Report for PCT Application No. PCT/CN2022/085126 dated Jun. 20, 2022, 4 pages.
(Continued)

*Primary Examiner* — Jeffrey P Aiello
(74) *Attorney, Agent, or Firm* — Jeenam Park

(57) ABSTRACT

An aero-engine fault diagnosis method based on 5G edge computing and deep learning is provided. The method includes following steps: performing data acquisition, pre-processing, and storage based on a new 5th Generation Mobile Communication Technology (5G) cloud-edge-terminal network architecture; constructing a machine learning module in an edge cloud, where historical data stored in the aero-engine fault database management system is used as training samples of the machine learning module; and per-
(Continued)

forming intelligent self-management of the aero-engine gear fault simulation platform and the aero-engine fault database management system.

9 Claims, 3 Drawing Sheets

(51) Int. Cl.
*G06N 3/0464* (2023.01)
*G01M 15/14* (2006.01)
*G06N 3/08* (2023.01)

(58) Field of Classification Search
CPC ........ G06N 3/006; G06N 3/047; G06N 3/042; G06N 20/00; G06N 5/04; G05B 23/0283; G05B 23/0221; G05B 23/0272; G05B 19/4183; G05B 19/4184; G05B 13/028; G05B 2219/37351; G05B 2219/37337; G05B 2219/35001; G06F 30/27; G06F 2111/10; G06F 2119/04; G06F 18/21; G06F 18/2178; G06F 17/18; G01M 13/028; G01M 13/045; G01M 7/00
USPC ........ 700/108, 169, 174, 275; 702/183, 188, 702/182, 196, 184, 185, 179, 35, 189; 703/6; 706/16, 904, 912

See application file for complete search history.

(56) References Cited

U.S. PATENT DOCUMENTS

| | | | |
|---|---|---|---|
| 2020/0272139 A1 | 8/2020 | Rakuff et al. | |
| 2020/0327371 A1 | 10/2020 | Sharma et al. | |
| 2020/0380391 A1 | 12/2020 | Allard et al. | |
| 2022/0230125 A1* | 7/2022 | Vedantam | G06Q 10/063114 |

FOREIGN PATENT DOCUMENTS

| | | | | |
|---|---|---|---|---|
| CN | 112101532 A | 12/2020 | | |
| CN | 112989712 A | 6/2021 | | |
| WO | WO-2021055824 A1 * | 3/2021 | ............. | G06N 3/006 |
| WO | WO-2022056869 A1 * | 3/2022 | ............. | B61L 27/53 |

OTHER PUBLICATIONS

First Office Action with English Translation for Chinese Application No. 202110457105.X, dated Jun. 29, 2021, 9 pages.

Notification of Grant with English Translation for Chinese Application No. 202110457105.X, dated Jul. 8, 2021, 3 pages.

* cited by examiner

AERO-ENGINE FAULT DIAGNOSIS METHOD BASED ON FIFTH-GENERATION TELECOMMUNICATION TECHNOLOGY STANDARD DISTRIBUTED COMPUTING FRAMEWORK AND DEEP LEARNING

CROSS REFERENCE TO RELATED APPLICATION(S)

This present application is a national stage application of International Patent Application NO. PCT/CN2022/085126, filed on Apr. 2, 2022, which claims priority to Chinese Patent Application No. 202110457105.X, filed with the Chinese Patent Office on Apr. 27, 2021, and entitled "AERO-ENGINE FAULT DIAGNOSIS METHOD BASED ON FIFTH-GENERATION TELECOMMUNICATION TECHNOLOGY STANDARD DISTRIBUTED COMPUTING FRAMEWORK AND DEEP LEARNING." The aforementioned application is incorporated herein by reference in their entireties.

TECHNICAL FIELD

The present disclosure relates to the field of complex device fault diagnosis, specifically to the field of aero-engine fault diagnosis, and in particular to an aero-engine fault diagnosis method based on a fifth-generation telecommunication technology standard distributed computing framework and deep learning.

BACKGROUND ART

Since the end of the $20^{th}$ century, with the continuous development of 5G information technologies, due to features of strong parallel processing capability, nonlinear function approximation ability, self-organization, self-learning, and self-adaptation, artificial neural networks are increasingly widely used for fault diagnosis in the aerospace field.

Specifically, an aero-engine, as the most important power component of an aircraft, has a complex mechanical structure and generally operates in a harsh environment, thus its internal components are prone to mechanical damage after long use, which greatly reduces working performance of the aero-engine. For example, when shafting parts, such as gears, bearings and others that form a rotating mechanism of the aero-engine, occur failures such as surface wear and other problems, they are prone to cause huge vibration and noise of engine components, reduce operating efficiency of the aero-engine, and seriously damage the entire aero-engine, resulting in huge economic losses. If faults cannot be accurately detected in real time, they would severely threaten the safety and efficiency of aerial operations. Therefore, it is of great significance to perform status monitoring, accurately determine a fault type in a timely manner, and predict fault occurrence, so as to ensure the safety of flight.

The fault diagnosis and identification of the aero-engine are mainly to perform feature mining, feature classification and feature prediction on fault types of shafting mechanisms such as gears and bearings. Currently, a vibration signal analysis method is most widely used in fault diagnosis of the gears and bearings of the aero-engine, in which vibration acceleration signals are acquired in a working process of the gears and the bearings with different damage statuses, and the vibration acceleration signals are classified and predicted by means of machine learning, to mine potential features of fault data, thereby greatly improving the efficiency and accuracy of the fault diagnosis.

SUMMARY

An objective of the present disclosure is to provide an aero-engine fault diagnosis method based on a fifth-generation telecommunication technology standard distributed computing framework and deep learning, to overcome defects in the prior art.

To achieve the foregoing objective, the present disclosure provides the following technical solutions:

An aero-engine fault diagnosis method based on a fifth-generation telecommunication technology standard distributed computing framework and deep learning is provided, where the method includes the following steps:

step 1: performing data acquisition, preprocessing, and storage based on a fifth-generation telecommunication technology standard distributed computing framework terminal (cloud, edge computing, and terminal) network architecture, where step 1 includes the following steps:

step 1.1: performing data acquisition, which includes: building an aero-engine gear fault simulation platform, and arranging, by using an edge computing technology, a base station in an edge network close to the aero-engine gear fault simulation platform, and acquiring vibration signals of gears in different positions and directions by acceleration sensors mounted on the aero-engine gear fault simulation platform, and converting the vibration signals into voltage signals; and step 1.2: establishing an aero-engine fault database management system, and preprocessing and storing data;

step 2: constructing a machine learning module in an edge cloud, where historical data stored in the aero-engine fault database management system is used as training samples of the machine learning module, and the machine learning module predicts and infers a behavior of an aero-engine through a one-dimensional convolutional neural network (1D-CNN) model by using the data from the aero-engine fault database management system, and performs joint optimization allocation on communication and computing resources; where step 2 includes the following steps:

step 2.1: building the 1D-CNN model, where the 1D-CNN model includes one input layer, five convolutional layers, five pooling layers, one fully-connected layer, and one output layer, and performing feature extraction and type recognition on the vibration signals by using the 1D-CNN model, and finally outputting probability values of the vibration signals under various fault types as a recognition result;

step 2.2: training the 1D-CNN model and visualizing a result of the 1D-CNN model, which includes: inputting the processed vibration signals of the aero-engine into a to-be-trained 1D-CNN model, setting a ratio of training sets to test sets, a number of iterations of the model, a batch size of data sent into the model for a single-time training, a number of training batches, and network parameters, and monitoring recognition accuracy of the 1D-CNN model and a change in a loss function value in real time, and outputting a recognition effect of the 1D-CNN model in a visual manner; and step 2.3: using a following model for implementing resource joint optimization allocation used when joint optimization allocation is performed on communication and computing resources:

$$\min \eta$$
$$\text{s.t.} \quad P_{Suc}(D > D_{threshold}) \leq \varepsilon$$

where $\varepsilon$ is a tolerable maximum value of error probability for a data packet of ultra-reliable and low-latency communication (URLLC) service, D is an actual delay of data packet transmission, $P_{Suc}(D{>}D_{threshold}){\leq}\varepsilon$ is a probabilistic delay constraint, and $\eta$ is a resource ratio of the URLLC service; and step 3: performing intelligent self-management of the aero-engine gear fault simulation platform and the aero-engine fault database management system, which includes: designing a decision center inside the aero-engine gear fault simulation platform, where the decision center receives an output from the machine learning module, and analyzes and makes decisions on a machine learning result of the machine learning module; and the decision center also manages the aero-engine fault database management system, and instructs the aero-engine fault database management system to cache in advance.

In some embodiments, in step 1.1, the base station, by configuring a timeslot number K contained therein, ensures that all terminal devices in each aero-engine meet a delay constraint of service transmission:

$$T_1 + T_R + \max\{T_1, \ldots, T_{N_{Tot}}\} \leq T_{Threshold}$$

where $T_1$ is a duration during which each terminal device transmits data for a first time; $T_R$ is a duration during which each terminal device retransmits the data after failing to transmit the data for the first time, $T_n$ ($1 \leq n \leq N_{Tot}$, $n \in N^+$) is a time interval between a moment at which a terminal device n fails to transmit the data for the first time and a moment of retransmitting the data next time, $N_{Tot}$ is a total number of terminal devices in a terminal device group, and $T_{Threshold}$ is a delay constraint of service transmission;

the base station allocates independent initial data transmission resources to each terminal device according to a number of terminal devices in a same group, and after failing to transmit the data for the first time, the terminal devices in the same group retransmit the data after the base station configures retransmission resources; and the contained timeslot number K is the number of timeslots of each group, and the timeslot number K is set to:

$$K = \lfloor [T_{Threshold} - (T_1 + T_R)] / T_S \rfloor$$

where $T_{Threshold}$ is the delay constraint of the service transmission, $T_s$ is a length of a data transmission timeslot, and $T_I$ is the duration during which each terminal device transmits the data for the first time, and $T_R$ is the duration during which each terminal device retransmits the data after failing to transmit the data for the first time.

In some embodiments, step 1.2 may specifically include the following steps:

in step 1.2.1: the aero-engine fault database management system performs data interaction with the aero-engine and a cloud sever, receives data from the aero-engine and caches the data, and uploads the data to the cloud sever; and in step 1.2.2: missing value processing, abnormal value processing, and normalization processing are performed on the voltage signals corresponding to the original vibration signals acquired in step 1.1, and data of different fault types is marked.

In some embodiments, in step 1.2.2, the missing value processing is a process in which a missing value is filled by using an average value of values on two sides of the missing value, the abnormal value processing is a process of discarding an abnormal value, and the normalization processing is performed by using a maximum and minimum normalization, which is expressed as:

$$x' = \frac{x - xmin}{xmax - xmin}$$

where xmax is a maximum value of sample data, xmin is a minimum value of the sample data, x' is a normalized result, and a value interval of the sample data is [0, 1].

In some embodiments, in step 2.1, the input layer of the 1D-CNN model is connected to the five convolutional layers, the five convolutional layers are respectively connected to five pooling layers, the five pooling layers are aggregated and connected to the fully-connected layer, and the fully-connected layer is connected to the output layer.

In some embodiments, in step 2.1, a feature map group of the input layer of the 1D-CNN model is a two-dimensional (2D) tensor, where one-dimensional (1D) array for each slice is one input feature map, and a number of channels of the input layer is equal to a number of the acceleration sensors mounted on the aero-engine gear fault simulation platform, and the vibration signals of gears of different fault types in different positions and directions acquired by the sensors are separately set as data features, and the fault types are set as data labels.

In some embodiments, in step 2.1, three neurons are connected between every two layers of neural networks in the convolution layer of the 1D-CNN model, and a formula for performing feature extraction on a local region during convolution is:

$$y_i^{l+1}(j) = f(w_i^l * x^l(j) + b_i^l)$$

where $w_i^l$ represents a weight of an $i^{th}$ convolution kernel in an $l_{th}$ layer, $b_i^l$ represents a bias of the $i^{th}$ convolution kernel in the $l^{th}$ layer, $x^l(j)$ represents an input of a $j^{th}$ neuron in the $l^{th}$ layer, $y_i^l+1(j)$ represents an input of the $j^{th}$ neuron to an $(l+1)^{th}$ layer, $y_i^{l+1}(j)$ is also an output of the $j^{th}$ neuron in the $l^{th}$ layer, f( ) is a nonlinear activation function, and a symbol * represents a dot product of a kernel and the local region, and after a convolution operation is completed each time, a feature mapped to a 1D tensor is output.

In some embodiments, in step 2.1, the pooling layer of the 1D-CNN model uses a maximum pooling method, a pooling region is represented by selecting a maximum activity value of all neurons in the pooling region, and a pooling function is expressed as:

$$y_i^{l+1}(j) = f(w_i^l * x^l(j) + b_i^l)$$

where $x_i$ represents an activity value of each neuron in a pooling region $R^d$.

In some embodiments, in step 2.1, the fully-connected layer of the ID-CNN model performs nonlinear combination on features extracted by the convolutional layer and the pooling layer:

$$y^l = f_l(w_i^l * x^{l-1} + b_i^l)$$

In the foregoing formula, $w_i^l$ is a weight matrix from the $(l-1)^{th}$ layer to the $l^{th}$ layer, $b_i^l$ is a bias from the $(l-1)^{th}$ layer to the $l^{th}$ layer, i represents a serial number of a neuron, and $f_l( )$ is a nonlinear activation function of the $l^{th}$ layer.

In some embodiments, in step 2.2, the visual manner adopts a line chart.

According to the specific embodiments provided in the present disclosure, the present disclosure has the following technical effects.

By efficiently utilizing limited aero-engine fault data resources under a 5G network architecture, and combining with computing and storage resources, the present disclosure can improve the storage and transmission speed of massive data running in aero-engine, and provide a reliable basis for aero-engine fault recognition.

In the present disclosure, an intelligent learning module is constructed in an edge cloud by using a machine learning technology, and a specific 1D-CNN is established, original vibration data of aero-engine gears (1D time-domain vibration signals) acquired in advance or stored in a database is used as an input of the ID-CNN, and is subjected to feature extraction through various layers of the ID-CNN, to implement fault type recognition. The edge computing technology is adopted to process data at a position close to a network access end, thereby reducing data transmission costs, saving data transmission time, and improving data transmission efficiency. The acquired 1D time-domain vibration signals are as input samples of the ID-CNN, and the ID-CNN can directly perform feature mining on time-domain signals, which avoids a process of processing the original signals, can complete fault type recognition and diagnosis more quickly, and has a potential application value in the processing of massive data running in aero-engine.

Compared with a conventional method for fault diagnosis of aeronautical rotating machine by combining signal processing and machine learning (which slices acquired vibration time-domain signals, converts the sliced vibration time-domain signals into a time-frequency graph by using a signal processing method, and then performs classification diagnosis by using image recognition or a neural network), in the present disclosure, a conventional neural network (CNN) operation is directly performed on the original one-dimensional vibration signals. This process is relatively simple, rich signal processing expertise is not required, and the recognition effect is also relatively ideal.

BRIEF DESCRIPTION OF THE DRAWINGS

To describe the technical solutions in the embodiments of the present disclosure or in the prior art more clearly, the accompanying drawings required for the embodiments are briefly described below. Apparently, the accompanying drawings in the following description show merely some embodiments of the present disclosure, and persons of ordinary skills in the art may still derive other accompanying drawings from these accompanying drawings without creative efforts.

DETAILED DESCRIPTION OF THE EMBODIMENTS

The technical solutions in the embodiments of the present disclosure will be described below clearly and completely with reference to the accompanying drawings in the embodiments of the present disclosure. Apparently, the described embodiments are merely some rather than all of the embodiments of the present disclosure. All other examples obtained by a person of ordinary skills in the art based on the examples of the present disclosure without creative efforts shall fall within the protection scope of the present disclosure.

Embodiment 1

Figure 1:
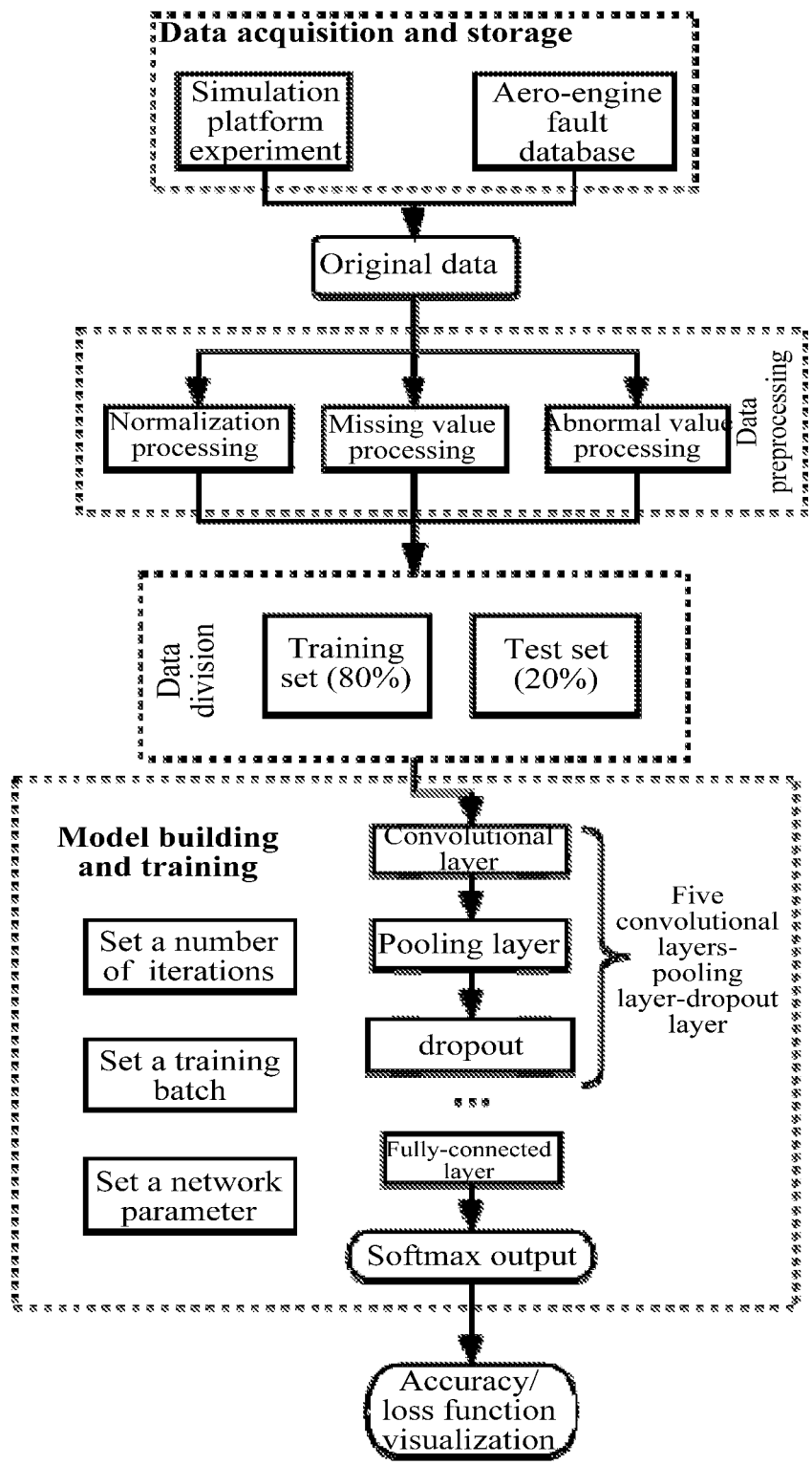
FIG. 1 is a flowchart of an aero-engine fault diagnosis method based on a fifth-generation telecommunication technology standard distributed computing framework and deep learning.

This embodiment provides an aero-engine fault diagnosis method based on fifth-generation telecommunication technology standard distributed computing framework and deep learning. A procedure of the method is shown in FIG. 1, and specifically includes the following steps.

In step 1, data acquisition, preprocessing, and storage are performed based on a fifth-generation telecommunication technology standard distributed computing framework terminal network architecture.

In step 1.1, data acquisition is performed. Specifically, an aero-engine gear fault simulation platform is built, and by using an edge computing technology (a 5G core technology), a base station is arranged in an edge network close to the aero-engine gear fault simulation platform, so that the platform acquires data, and directly processes, transmits, and stores the data at a the edge of the network, to avoid a delay, a loss, and the like caused due to returning the data to a core network. For gears with different fault types, vibration signals of the gears in different positions and directions are acquired by acceleration sensors mounted on the aero-engine gear fault simulation platform, and the vibration signals are converted into voltage signals. the base station, by configuring a timeslot number K contained therein, ensures that all terminal devices in each aero-engine meet a delay constraint of service transmission:

$$T_I + T_R + \max\{T_1, \ldots, T_{N_{Tot}}\} \le T_{Threshold}$$

where $T_I$ is a duration during which each terminal device transmits data for a first time, $T_R$ is a duration during which each terminal device retransmits the data after failing to transmit the data for the first time, $T_n (1 \le n \le N_{Tot}, n \in N^+)$ is a time interval between a moment at which a terminal device n fails to transmit the data for the first time and a moment of retransmitting the data next time, $N_{Tot}$ is a total number of terminal devices in a terminal device group, and $T_{Threshold}$ is a delay constraint of service transmission.

The base station allocates independent and initial data transmission resources to each terminal device according to a number of terminal devices in a same group, and after failing to transmit the data for the first time, the terminal devices in the same group retransmit the data after the base station configures retransmission resources.

The contained timeslot number K is a size of each group, and the timeslot number K is set to:

$$K = \lfloor [T_{Threshold} - (T_I + T_R)] / T_S \rfloor$$

where $T_{Threshold}$ is a delay constraint of the service transmission, $T_S$ is a length of a data transmission timeslot, and $T_I$ is the duration during which each terminal device transmits the data for the first time, and $T_R$ is the duration during which each terminal device retransmits the data after failing to transmit the data for the first time.

In step 1.2, an aero-engine fault database management system is established through a data acquisition system by using a database technology such as mySQL or Oracle, to implement data interaction and data effective storage, and the data is preprocessed and stored.

In step 1.2.1, the aero-engine fault database management system performs data interaction with the aero-engine and a cloud sever, receives data from the aero-engine, caches the data for the aero-engine in advance, and uploads the data to the cloud sever.

In step 1.2.2, missing value processing, abnormal value processing, and normalization processing are performed on the voltage signals correspond to the original vibration signals acquired in step 1.1, and data of different fault types is marked, to ensure the efficiency of subsequent model training. The missing value processing is a process in which a missing value is filled in by using an average value of values located on two sides of the missing value. The abnormal value processing is to discard an abnormal value, where the abnormal value is generated due to temporary data fluctuation caused by an instrument error suddenly. The normalization processing uses a maximum and minimum normalization, and a normalization formula is expressed as:

$$x' = \frac{x - xmin}{xmax - xmin}$$

where xmax is a maximum value of sample data, xmin is a minimum value of the sample data, x' is a normalized result, and a value interval of the sample data is [0, 1].

In step 2, a machine learning module is constructed in an edge cloud by using a machine learning technology. Historical data stored in the aero-engine fault database management system is used as training samples of the machine learning module, and a behavior of an aero-engine is predicted and inferred through the machine learning module by using the data from the aero-engine fault database management system and a ID-CNN model, so that joint optimization allocation is performed on communication and computing resources;

In step 2.1, a ID-CNN model is built by Python language, where the ID-CNN model includes one input layer, five convolutional layers, five pooling layers, one fully-connected layer, and one output layer (a specific network structure may be adjusted according to specified data). The input layer of the 1D-CNN model is connected to five convolutional layers, the five convolutional layers are respectively connected to five pooling layers, the five pooling layers are aggregated and connected to the fully-connected layer, and the fully-connected layer is connected to the output layer. Feature extraction and type recognition are performed on the vibration signals by using the 1D-CNN model, and probability values of the vibration signal for various fault types are finally output as a recognition result.

A feature map group of the input layer is a 2D tensor, where ID array for each slice is one input feature map, and a number of channels for the input layer is equal to a number of the acceleration sensors mounted on the aero-engine gear fault simulation platform. For gears with different fault types, the vibration signals of gears in different positions and directions acquired by the sensors are respectively set as data features, and the fault types are set as data labels.

Three neurons are connected between every two layers of neural networks in the convolutional layer, and a formula for performing feature extraction on a local region during convolution is:

$$y_i^{l+1}(j) = f_l(w_i^l * x^l(j) + b_i^l)$$

where $w_i^l$ represents a weight of an $i^{th}$ convolution kernel in an $l^{th}$ layer, $b_i^l$ represents a bias of the $i^{th}$ convolution kernel in the $l^{th}$ layer, $x^l(j)$ represents an input of a $j^{th}$ neuron in the $l^{th}$ layer, $y_i^{l+1}(j)$ represents an input of the $j^{th}$ neuron to an $(l+1)^{th}$ layer, $y_i^{l+1}(j)$ is also an output of the $j^{th}$ neuron in the $l^{th}$ layer; f( ) is a nonlinear activation function, and generally adopts a Relu function, and a symbol * represents a dot product of a kernel and the local region; and after a convolution operation is completed each time, a feature mapped to a 1D tensor is output.

The pooling layer uses a maximum pooling method, in which a pooling region is represented by selecting a maximum activity value of all neurons in the pooling region, and a pooling function is expressed as:

$$y^d = \max x_i (i \in R^d)$$

where $x_i$ is an activity value of each neuron in a pooling region $R^d$; and divisions of each feature map in the pooling layer should not be excessively large, and a pooling kernel is set to 2×1.

The fully-connected layer performs nonlinear combination on features extracted by the convolutional layer and the pooling layer:

$$y^l = f_l(w_i^l * x^{l-1} + b_i^l)$$

where $w_i^l$ is a weight matrix from the $(l-1)^{th}$ layer to the $l^{th}$ layer, $b_i^l$ is a bias from the $(l-1)^{th}$ layer to the $l^{th}$ layer, i represents a serial number of a neuron, $f_l( )$ is a nonlinear activation function of the $l^{th}$ layer and adopts a Relu function.

In step 2.2, the ID-CNN model is trained and a result from the 1D-CNN is visualized. Specifically, aero-engine vibration signals processed as above are inputted into a to-be-trained 1D-CNN, and a ratio of training sets to test sets (which is generally 4:1, and a proportion of the test sets in total sets can be appropriately increased when a data amount is relatively large), a number of iterations of the model (which is 500, or may be appropriately adjusted according to the data amount), a size of a batch of data sent into the model for a single-time training, a number of training batches, and a network parameter (32 samples, or a multiple of 16). Recognition accuracy of the ID-CNN model and a change in a value of a loss function are monitored in real time. A recognition result of the 1D-CNN model is output in a manner of a line chart.

In step 2.3, when joint optimization allocation is performed on communication and computing resources, a model for implementing resource joint optimization allocation is expressed as follows:

$$\min \eta$$
$$\text{s.t.} \quad P_{Suc}(D > D_{threshold}) \leq \varepsilon$$

where $\varepsilon$ is a tolerable maximum value of error probability for a data packet of URLLC service, D is an actual delay of data packet transmission, $P_{Suc}(D > D_{threshold}) \leq \varepsilon$ is a probabilistic delay constraint, and $\eta$ is a resource ratio of the URLLC service. When the URLLC service and an enhanced mobile broadband (eMBB) service are reused in a resource reservation mode, a larger resource ratio $\eta$ of the URLLC service indicates better quality of service (QOS) of the URLLC service, but a greater impact on the eMBB service. Therefore, $\eta$ is minimized under the constraint of ensuring high QoS of the URLLC service, so that the impact on the eMBB service is correspondingly minimized.

In step 3, intelligent self-management of the aero-engine gear fault simulation platform and the aero-engine fault database management system is performed. Specifically, a decision center is designed inside the aero-engine gear fault simulation platform, where the decision center receives an output from the machine learning module, and analyzes and makes decisions on a machine learning result from the machine learning module by using a tool such as a game theory, to implement functions such as computation offloading, edge-cloud collaboration, and resource optimization allocation, and the decision center also performs intelligent management on the aero-engine fault database management system, and instructs the aero-engine fault database management system to cache in advance.

Embodiment 2

Figure 2:
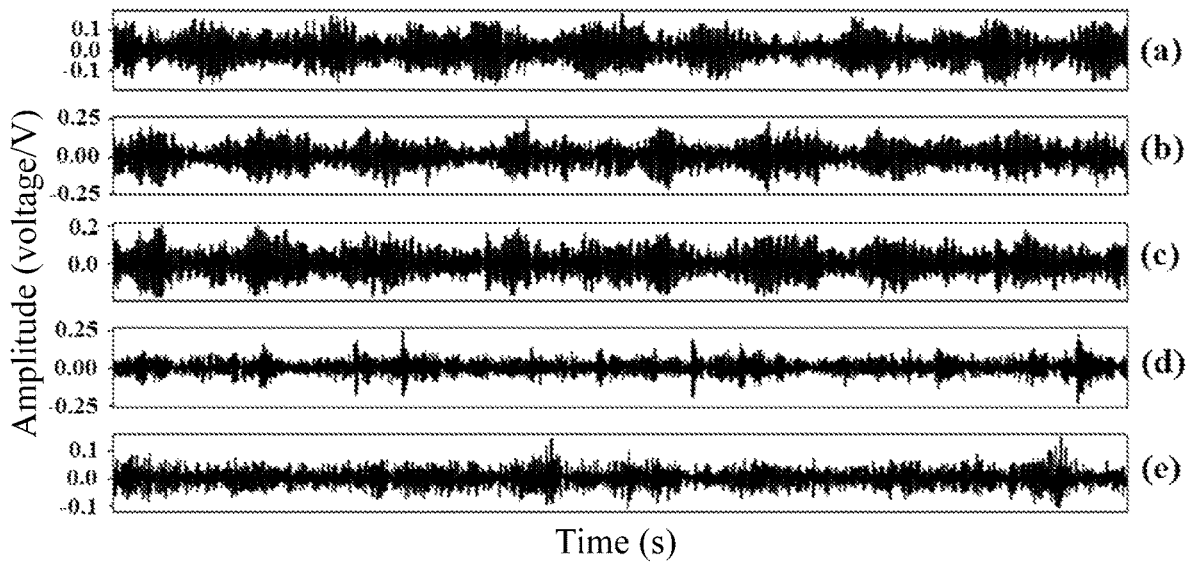
FIG. 2 is a data diagram of aero-engine gear fault signals.

Based on Embodiment 1, FIG. 2 shows vibration signal data acquired for five different fault types by the aero-engine gear fault simulation platform under a same sensor arrangement, where a horizontal axis represents a sampling time, and a vertical axis represents voltage values converted from vibration signals acquired by the acceleration sensor. The five different fault types correspond to a normal gear (a), a broken tooth (b), a missing tooth (c), tooth surface wear (d), and a tooth root crack (e), which can be added and deleted according to a specific situation. The data may alternatively be real-time status data acquired by using the aero-engine under a real running situation. A sampling frequency and a sensor position arrangement set during data acquisition may be determined according to an actual situation. If necessary, to improve the accuracy of model training, other types of sensors such as an acoustic sensor may be added. After original data is obtained, data preprocessing is performed on the original data, a missing value is completed by using an average value, an abnormal value is discarded, and a normalization operation is finally performed. In this embodiment, according to different fault types, classification calibration needs to be performed on the data, and specific labels are set in Table 1 below:

TABLE 1

Labels of a gear dataset

| Sample number (test sets/training sets) | Fault types | Classification label |
|---|---|---|
| 4800/1200 | Normal gear | 0 |
| 4800/1200 | Missing tooth | 1 |
| 4800/1200 | Broken tooth | 2 |
| 4800/1200 | Tooth surface wear | 3 |
| 4800/1200 | Tooth root crack | 4 |

Figure 3:
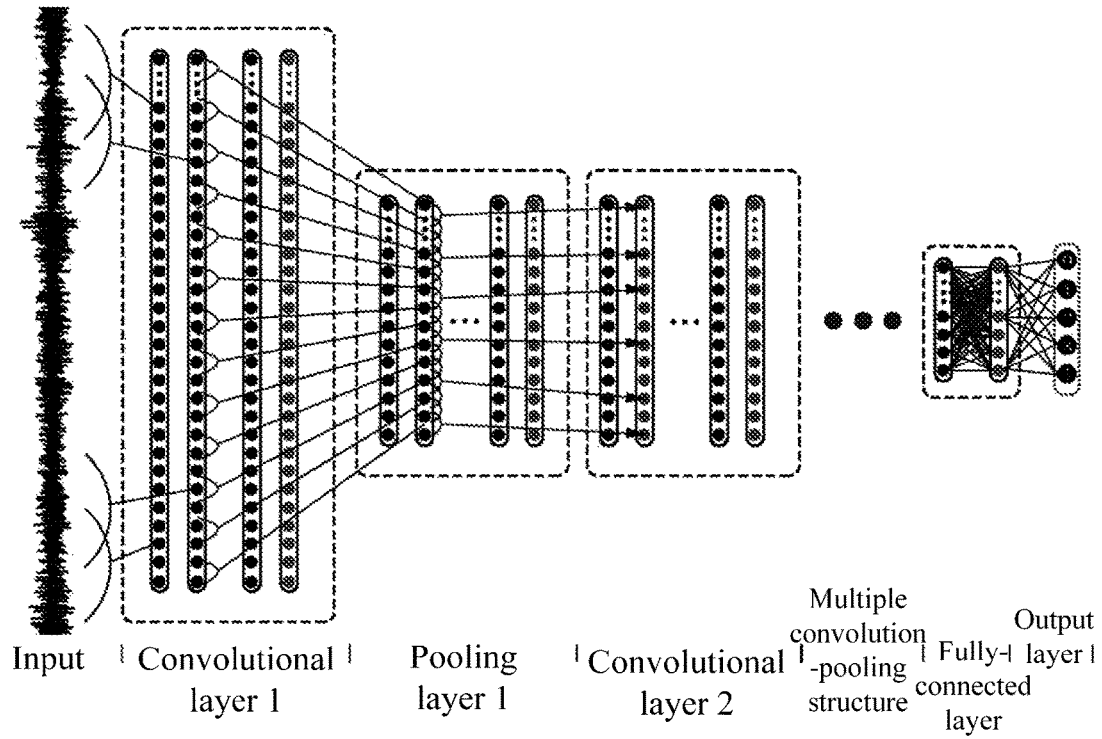
FIG. 3 is a schematic structural diagram of a 1D-CNN.

FIG. 3 is a schematic structural diagram of a built 1D-CNN. A specific structure of the 1D-CNN model provided in this embodiment is formed by five convolutional layers, five pooling layers, one fully-connected layer, and one Softmax output layer. After passing through the first convolutional layer, signals are converted into a set of feature maps, and the set of feature maps is then downsampled through max pooling. After these operations are repeated for 4 times, features output by the last pooling layer are input to the fully-connected layer, then the fully-connected layer is activated through the Relu function, the features are transferred into the Softmax layer, to finally obtain a probability value of each classification, and a class with a highest probability is regarded as the recognition result. After each pooling operation, a Dropout layer needs to be added, and a discard ratio is 20%, that is, 20% of training parameters are discarded, to improve the model training speed and avoid overfitting. The specific network parameters (such as sliding stride of convolution kernel) are set in Table 2.

TABLE 2

Detailed parameters of 1D-CNN

| Layer number | Layer types | Size and stride of a kernel | Number of channels of a kernel |
|---|---|---|---|
| 1 | Convolutional layer 1 | 64 × 1/1 × 1 | 16 |
| 2 | Pooling layer 1 | 16 × 1/16 × 1 | 16 |
| 3 | Convolutional layer 2 | 32 × 1/1 × 1 | 64 |
| 4 | Pooling layer 2 | 2 × 1/2 × 1 | 64 |
| 5 | Convolutional layer 3 | 32 × 1/1 × 1 | 128 |
| 6 | Pooling layer 3 | 2 × 1/2 × 1 | 128 |
| 7 | Convolutional layer 4 | 16 × 1/1 × 1 | 128 |
| 8 | Pooling layer 4 | 2 × 1/2 × 1 | 128 |
| 9 | Convolutional layer 5 | 16 × 1/1 × 1 | 128 |
| 10 | Pooling layer 5 | 2 × 1/2 × 1 | 128 |
| 11 | Fully-connected layer | 100 | 1 |
| 12 | Softmax layer | 5 | 1 |

Figure 4:
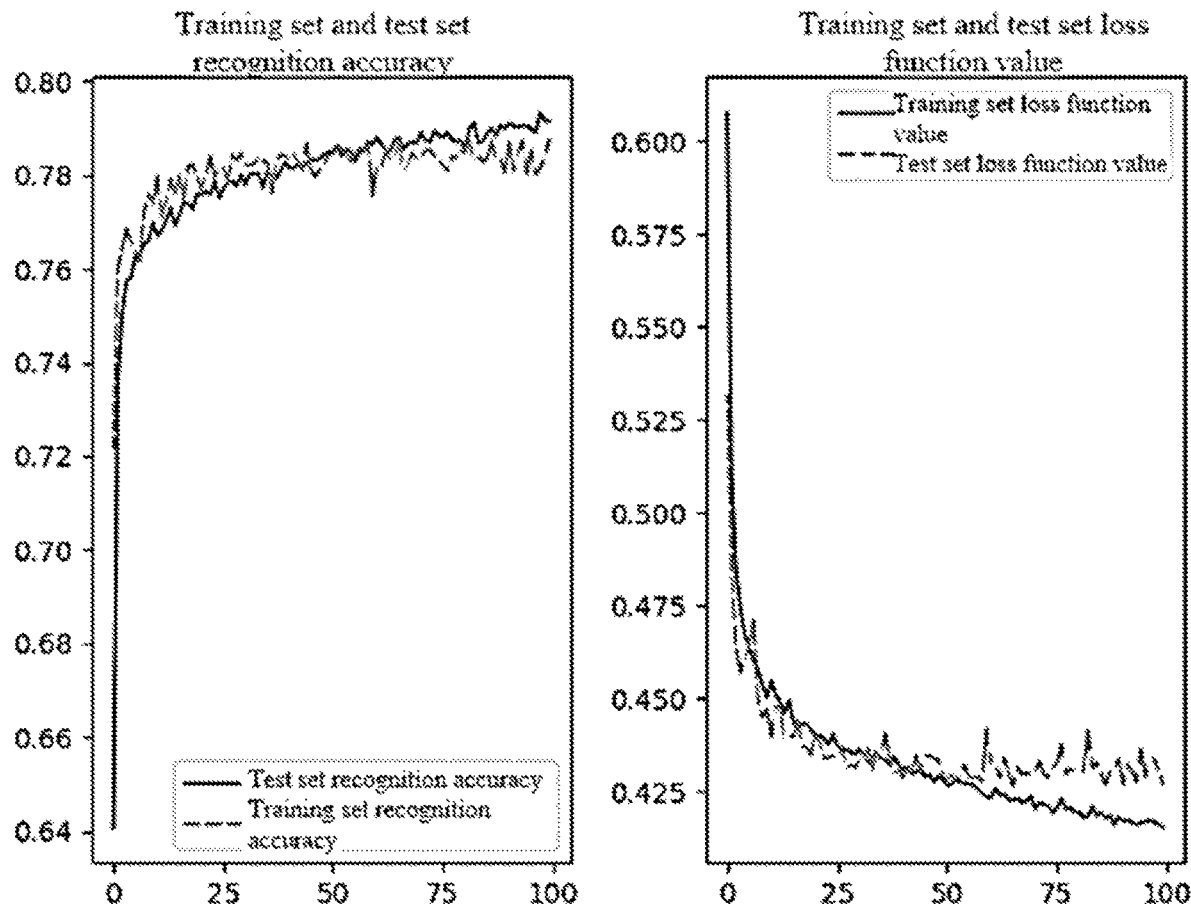
FIG. 4 is a schematic diagram of a visible training result of the ID-CNN.

After the neural network model is built, preprocessed data needs to be inputted into the neural network according to a ratio of training sets/test sets 4/1, a number of iterations of the model is set to 100, a batch size for each training is 32, and a real-time change of accuracy and a loss function value is finally drawn through matplotlib (as shown in FIG. 4), and a confusion matrix of the recognition result may be further drawn, to observe a specific recognition situation of the model. The parameters of the 1D-CNN model may be gradually adjusted to optimize the training effect of the model.

Compared with a conventional method for fault diagnosis of aeronautical rotating machine by combining signal processing and machine learning (which slices acquired vibration time-domain signals, converts the sliced vibration time-domain signals into a time-frequency graph through using a signal processing method, and then performs classification diagnosis by using image recognition or a neural network), in this embodiment, a CNN operation is directly performed on the original one-dimensional vibration signals. This process is relatively simple, rich signal processing expertise is not required, the recognition effect is also ideal, and a lowest recognition rate can reach 78.97%. Table 3 shows a table of a comparison result between the method in this embodiment and the conventional machine learning method.

TABLE 3

Recognition effect of various machine learning methods

| Model name | Root mean square error | Accuracy |
|---|---|---|
| Feedforward neural network | 0.751 | 63.90% |
| Support vector machine | 0.690 | 63.08% |
| Convolutional neural network | 0.427 | 78.97% |

The recognition accuracy of the method of the present disclosure is increased by 15.07% compared with recognition accuracy 63.90% of a common feedforward neural network, and is increased by 15.89% compared with the recognition accuracy 63.08% of a support vector machine, and this method has a lower root mean square error (RMSE) for gear fault diagnosis. Parameter optimization is further performed for specific data, to recognize the aero-engine faults more accurately.

Each example of the present specification is described in a progressive manner, each example focuses on the difference from other examples, and the same and similar parts between the examples may refer to each other.

Although the principle and implementations of the present disclosure are described by using specific examples in this specification, the descriptions of the foregoing embodiments are merely intended to help understand the method and the core idea of the method of the present disclosure. In addition, a person of ordinary skills in the art may make modifications to the specific implementations and application range according to the idea of the present disclosure. In conclusion, the content of this specification shall not be construed as a limitation to the present disclosure.

What is claimed is:

1. An aero-engine fault diagnosis method based on a fifth-generation telecommunication technology standard distributed computing framework and deep learning, comprising following steps:
   step 1: performing data acquisition, preprocessing, and storage based on a fifth-generation telecommunication technology standard distributed computing framework terminal network architecture, wherein step 1 comprises following steps:
   step 1.1: performing data acquisition, which comprises: building an aero-engine gear fault simulation platform, and arranging, by using an edge computing technology, a base station in an edge network close to the aero-engine gear fault simulation platform, and acquiring vibration signals of gears in different positions and directions by acceleration sensors mounted on the aero-engine gear fault simulation platform, and converting the vibration signals into voltage signals, wherein the base station, by configuring a timeslot number K contained therein, ensures that all terminal devices in each aero-engine meet a delay constraint of service transmission:

$$T_I + T_R + \max\{T_1, \ldots, T_{N_{Tot}}\} \leq T_{Threshold};$$

wherein $T_I$ is a duration during which each terminal device transmits data for a first time, $T_R$ is a duration during which each terminal device retransmits the data after failing to transmit the data for the first time, $T_n (1 \leq n \leq N_{Tot}, n \in N^+)$ is a time interval between a moment at which a terminal device n fails to transmit the data for the first time and a moment of retransmitting the data next time, $N_{Tot}$ is a total number of the terminal devices in a terminal device group, and $T_{Threshold}$ is a delay constraint of service transmission;
   the base station allocates independent initial data transmission resources to each terminal device according to a number of the terminal devices in a same group, and after failing to transmit the data for the first time, the terminal devices in the same group retransmit the data after the base station configures retransmission resources;
   the contained timeslot number K is the number of timeslots of each group the timeslot number K of each group is set to:

$$K = \lfloor [T_{Threshold} - (T_I + T_R)] / T_S \rfloor$$

wherein $T_{Threshold}$ is the delay constraint of the service transmission, $T_S$ is a length of a data transmission timeslot, and $T_I$ is the duration during which each terminal device transmits the data for the first time, and $T_R$ is the duration during which each terminal device retransmits the data after failing to transmit the data for the first time; and
   step 1.2: establishing an aero-engine fault database management system, and preprocessing and storing the data;
   step 2: constructing a machine learning module in an edge cloud, wherein historical data stored in the aero-engine fault database management system is used as training samples of the machine learning module, and the machine learning module predicts and infers a behavior of an aero-engine through a one-dimensional convolutional neural network (1D-CNN) model by using the data from the aero-engine fault database management system, and performs joint optimization allocation on communication and computing resources, wherein step 2 comprises following steps:
   step 2.1: building the 1D-CNN model, wherein the 1D-CNN model comprises one input layer, five convolutional layers, five pooling layers, one fully-connected layer, and one output layer, and performing feature extraction and type recognition on the vibration signals by using the 1D-CNN model, and outputting probability values of the vibration signals under various fault types, as a recognition result;
   step 2.2: training the 1D-CNN model and visualizing a result of the 1D-CNN model, which comprises: inputting the processed vibration signals of the aero-engine into a to-be-trained 1D-CNN model, setting a ratio of training sets to test sets, a number of iterations of the model, a batch size of data sent into the model for a single-time training, a number of training batches, and network parameters, and monitoring recognition accuracy of the 1D-CNN model and a change in a loss function value in real time; and outputting a recognition result of the 1D-CNN model; and
   step 2.3: using a following model for implementing resource joint optimization allocation used when joint optimization allocation is performed on communication and computing resources:

$$\min \eta$$
   $$\text{s.t.} \quad P_{Suc}(D > D_{threshold}) \leq \varepsilon$$

wherein $\varepsilon$ is a tolerable maximum value of error probability for a data packet of ultra-reliable and low-latency communication (URLLC) service, D is an actual delay of data packet transmission, $P_{Suc}(D > D_{threshold}) \leq \varepsilon$ is a probabilistic delay constraint, and $\eta$ is a resource ratio of the URLLC service; and
   step 3: performing self-management of the aero-engine gear fault simulation platform and the aero-engine fault database management system, which comprises: providing a decision center inside the aero-engine gear fault simulation platform, wherein the decision center receives an output from the machine learning module, and analyzes and makes decisions on a machine learning result of the machine learning module; and the decision center also manages the aero-engine fault database management system, and instructs the aero-engine fault database management system to cache in advance.

2. The aero-engine fault diagnosis method based on the fifth-generation telecommunication technology standard distributed computing framework and deep learning according to claim 1, wherein step 1.2 comprises following steps:

step 1.2.1: performing, by the aero-engine fault database management system, data interaction with the aero-engine and a cloud sever, receiving data from the aero-engine and caches the data, and uploading the data to the cloud sever; and step 1.2.2: performing missing value processing, abnormal value processing, and normalization processing on the voltage signals corresponding to the original vibration signals acquired in step 1.1, and marking data of different fault types.

3. The aero-engine fault diagnosis method based on the fifth-generation telecommunication technology standard distributed computing framework and deep learning according to claim 2, wherein in step 1.2.2, the missing value processing is a process in which a missing value is filled by using an average value of values on two sides of the missing value, the abnormal value processing is a process of discarding an abnormal value, and the normalization processing is performed by using a maximum and minimum normalization, which is expressed as:

$$x' = \frac{x - xmin}{xmax - xmin}$$

wherein xmax is a maximum value in sample data, xmin is a minimum value in the sample data, x' is a normalized result, and a value interval of the sample data is [0, 1].

4. The aero-engine fault diagnosis method based on the fifth-generation telecommunication technology standard distributed computing framework and deep learning according to claim 1, wherein in step 2.1, the input layer of the 1D-CNN model is connected to the five convolutional layers, the five convolutional layers are respectively connected to five pooling layers, the five pooling layers are aggregated and connected to the fully-connected layer, and the fully-connected layer is connected to the output layer.

5. The aero-engine fault diagnosis method based on the fifth-generation telecommunication technology standard distributed computing framework and deep learning according to claim 1, wherein in step 2.1, a feature map group of the input layer of the 1D-CNN model is a two-dimensional (2D) tensor, one-dimensional (1D) array for each slice is one input feature map, and a number of channels of the input layer is equal to a number of the acceleration sensors mounted on the aero-engine gear fault simulation platform, and the vibration signals of gears of different fault types in different positions and directions acquired by the sensors are set as data features, and the fault types are set as data labels.

6. The aero-engine fault diagnosis method based on the fifth-generation telecommunication technology standard distributed computing framework and deep learning according to claim 1, wherein in step 2.1, three neurons are connected between every two layers of neural networks in the convolution layer of the 1D-CNN model, and a formula for performing feature extraction on a local region during convolution is:

$$y_i^{l+1}(j) = f(w_i^l * x^l(j) + b_i^l)$$

wherein $w_i^l$ represents a weight of an $i^{th}$ convolution kernel in an $l^{th}$ layer, $b_i^l$ represents a bias of the $i^{th}$ convolution kernel in the $l^{th}$ layer, $x^l(j)$ represents an input of a $j^{th}$ neuron in the $l^{th}$ layer, $y_i^{l+1}(j)$ represents an input of the $j^{th}$ neuron to an $(l+1)^{th}$ layer, $y_i^{l+1}(j)$ is also an output of the $j^{th}$ neuron in the $l^{th}$ layer, f( ) is a nonlinear activation function, and a symbol * represents a dot product of a kernel and the local region, and after a convolution operation is completed each time, a feature mapped to a 1D tensor is output.

7. The aero-engine fault diagnosis method based on the fifth-generation telecommunication technology standard distributed computing framework and deep learning according to claim 1, wherein in step 2.1, the pooling layer of the 1D-CNN model uses a maximum pooling method, a pooling region is represented by selecting a maximum activity value of all neurons in the pooling region, and a pooling function is expressed as:

$$y^d = \max x_i (i \in R^d)$$

wherein $x_i$ represents an activity value of each neuron in a pooling region $R^d$.

8. The aero-engine fault diagnosis method based on the fifth-generation telecommunication technology standard distributed computing framework and deep learning according to claim 1, wherein in step 2.1, the fully-connected layer of the 1D-CNN model performs nonlinear combination on features extracted by the convolutional layer and the pooling layer:

$$y^l = f_i(w_i^l * x^{l-1} + b_i^l)$$

wherein $w_i^l$ is a weight matrix from the $(l-1)^{th}$ layer to the $l^{th}$ layer, $b_i^l$ is a bias from the (l-1) th layer to the $l^{th}$ layer, i represents a serial number of a neuron, and $f_i($ ) is a nonlinear activation function of the $l^{th}$ layer.

9. The aero-engine fault diagnosis method based on the fifth-generation telecommunication technology standard distributed computing framework and deep learning according to claim 1, wherein in step 2.2, the visual manner adopts a line chart.

* * * * *